Patented July 12, 1927.

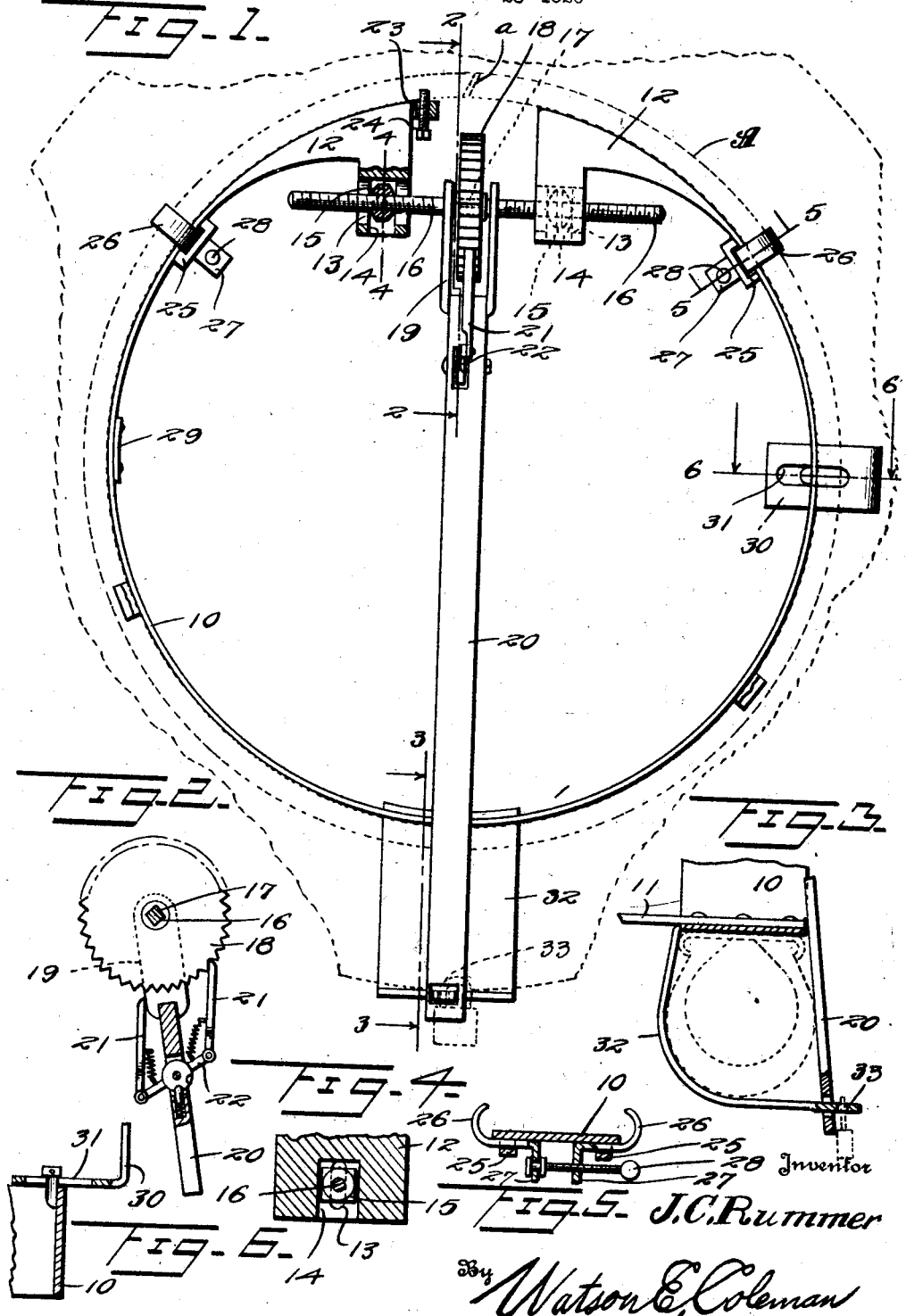

1,635,907

UNITED STATES PATENT OFFICE.

JOHN C. RUMMER, OF FLEMINGTON, PENNSYLVANIA, ASSIGNOR OF ONE-HALF TO DAVID STEWART, OF LOCK HAVEN, PENNSYLVANIA.

COMBINED TIRE AND RIM CARRIER AND RIM TOOL.

Application filed October 28, 1926. Serial No. 144,740.

This invention relates to tire carriers such as are mounted upon an automobile for the purpose of carrying spare tires and their rims.

The general object of the present invention is to provide a carrier of this character which is so constructed that the rim may be expanded into place against the tire or be caused to contract to permit the tire to be removed from the rim, the device thus acting as a tire tool.

A further object is to provide a carrier which, when the tire is mounted thereon, will hold the tire in place from any accidental or felonious detachment.

A still further object is to provide a construction of this character including an expansible, split annulus having means for engaging over a tire rim and over the tire itself and having means whereby the ends of the split annulus may be drawn together or forced apart in order to contract or expand the split annulus which constitutes the carrier.

Still another object is to provide means for this purpose including an oppositely screw-threaded rod engaging the two ends of the annulus, a ratchet wheel for operating said screw, and a handle for giving a step by step rotation to the ratchet wheel in opposite directions, this handle having means whereby it may be locked to the support for the annulus to thereby prevent, when the handle is locked, the rim and tire from being removed.

Other objects have to do with the details of construction and arrangement of parts to appear more fully hereinafter.

My invention is illustrated in the accompanying drawings wherein:—

Figure 1 is a front elevation of my tire carrier and tire tool;

Fig. 2 is a fragmentary section on the line 2—2 of Figure 1;

Fig. 3 is a section on the line 3—3 of Figure 1;

Fig. 4 is a section on the line 4—4 of Figure 1;

Fig. 5 is a section on the line 5—5 of Figure 1;

Fig. 6 is a section on the line 6—6 of Figure 1.

Referring to these drawings 10 designates a split annulus consisting of a steel band having a width equal to the width of the standard rim, this band being about ⅛″ thick and about 3½″ wide. The middle of the band is supported on the bracket 11 which is intended to be attached to the automobile at any desired point. The split in the band is diametrically opposite this support 11. The band at this point is thickened or otherwise formed to provide two heads 12, each of these heads being vertically slotted on its end faces as at 13, and each of these heads being hollowed out, as at 14, to constitute a seat for a nut 15, this nut having convexly rounded forward and rear faces so that it may tilt within its seat, each nut, of course, being held from rotative movement. Engaging this nut is a contracting or expanding screw designated generally 16, having screw-threads of opposite pitch at its opposite ends and engaging the nuts 15. The middle portion of this screw 16 is squared at 17 and carries upon it a ratchet wheel 18 so that the screw will turn with the ratchet wheel. A yoke 19 embraces the ratchet wheel and loosely engages the screw 16 and this yoke carries the handle 20, which is of such length that when the handle is turned to a vertical position it will come opposite to the bracket 11 and may be locked thereto.

Double pawls 21 are mounted upon the handle 20 so that either pawl may be shifted into engagement with the ratchet wheel. These pawls are pivotally mounted upon a pivoted bar or lever 22 so that one or the other pawl may be shifted into position. Any construction of this character and operating in this general way may be substituted for the pawls which I have illustrated.

It will be obvious now that when the handle 20 is oscillated, the screw shaft 16 will be turned in one direction or the other and that when turned in one direction, the band 10 will be contracted and when turned in the opposite direction, the band will be expanded. One of the heads 12 is formed with an outstanding lug 23 through which passes an adjusting screw 24 having a head whereby it may be turned so as to impinge against the inner face of the rim.

Mounted upon the band of the carrier 10 at a plurality of points as, for instance, on each side of the split in the band 10, are the rim and tire clamps, illustrated in detail in Figure 3. To this end the band 10 is formed with the two oppositely disposed, inwardly extending lugs 25 through which the shanks of the oppositely disposed hooks 26 pass. The shanks of the hooks at their inner ends are formed with inwardly projecting lugs 27, through which a screw 28 passes, so formed that when the screw is turned in one direction, the hooks will be drawn towards each other and when turned in the other direction, the hooks will be or may be separated. These hooks 26 will clamp the rim to the band 10 adjacent the split in the band.

It will be seen from Figure 1 that this carrier is designed to be used with a split rim A which is split at $a$, this split coinciding with the split in the band 10 and thus, if the screw 24 be turned to force one end of the rim outward and the screw 16 be turned to draw the heads 12 towards each other, the other end of the rim will be forced inward and away from the tire B and that by thus contracting the rim, it will separate from the tire and the tire may be readily removed from the rim and replaced by another tire. Then a reverse motion of the screw 16 will act to expand the rim and then the screw 24 is retracted so as to permit the two ends of the rim to be brought snugly against each other and held in this position by the usual clamp or latch.

I do not wish to be limited to any particular means for supporting the carrier but I have illustrated, in addition to the bracket 11 a brace 29 which is riveted or otherwise attached to the band 10 and a brace 30 which is slotted at 31 and with which the carrier has sliding engagement. These braces 29 and 30 are adapted to be attached to the body of an automobile so as to support the carrier. The brace 30, of course, permits the expansion and contraction of the carrier. Preferably, though I do not wish to be limited to this, the handle 20 is held in its closed position by a locking member 32 which passes through an aperture in the handle 20 and through the bracket 11 and has an aperture for the passage of the lock as at 33, this brace extending upward and around the tire and over the rim so as to absolutely lock the tire and rim from any detachment and particularly lock the tire from detachment from the rim. This is also aided by the handle 20 which extends down past the tire and rim.

In the use of this construction, the handle 20 is manipulated to contract the carrier formed by the band 10 and then the rim and tire is slipped in place over the band. The band 10 is then expanded so as to closely fit the rim and hold it against any contraction and expanded against the tire. The hooks 26 are then contracted so as to engage around the tire and rim or over the margins of the rim and the handle 20 brought down to the position shown in Figure 1 and locked. If it is desired to remove the rim and tire, the carrier is contracted and the hooks 26 released when the rim may be readily slipped off of the carrier. If it be desired to use the carrier as a tire tool for the purpose of detaching the rim from the tire, the rim and tire are placed upon the band 10 and engaged as before. The carrier is then contracted, the screw 24 being turned outward so as to hold one end of the rim expanded while the other end is contracted, and the rim is then contracted as before stated, until the two ends of the spring can spring past each other and the tire may then be readily removed and a new tire disposed upon the rim. Even if the air be let out of the tire, the tire cannot be removed from the rim because of the fact that the tire is held by the locking member 32 and the tire cannot be slipped out of this locking member.

While I have illustrated certain details of construction and arrangement of parts which I have found to be particularly effective, I do not wish to be limited thereto as it is obvious that many changes might be made therein without departing from the spirit of the invention as defined in the appended claims. Thus, while I have illustrated the heads 12 as being disposed in the medial plane of the band 10, I do not wish to be limited to this as under some circumstances the head will be offset relative to the band so as to allow the bolt or screw 16 to clear the valve stem of the tire as in some makes of car it is necessary that the head shall be offset relative to the rim.

I claim:—

1. A tie carrier of the character described including an expansible and contractible annular band split at one point, a support for said band diametrically opposite the split therein, heads formed upon the ends of the band and confronting each other, nuts mounted in said heads for oscillation, an oppositely threaded screw passing through the heads and engaging said nuts, a ratchet wheel mounted upon the screw, a handle oscillatably mounted upon the screw and having a yoke embracing the ratchet wheel, pawls carried upon the handle and coacting with the ratchet wheel, the pawls being so mounted that one or the other of the pawls may be thrown out or operation, and means on the band on each side of the split therein for engagement with a rim, the handle and the support upon which the rim is mounted having coacting locking means, comprising a locking member insertable through the support and the handle and curved to extend around the tire and rim and over the inside of the band.

2. A tire carrier of the character described comprising a flexible band split at one point and having heads at its ends, means engaging said heads whereby the heads may be forced apart or drawn towards each other and including a lever, means on one of said heads for forcing one end of the tire rim outward from the head, rim clamping means mounted upon the band adjacent the heads, a support upon which the band is mounted, and a locking member secured to the support and curved to extend around the tire and rim and through the lever.

3. A tire carrier of the character described including an expansible and contractible band split at one point, the ends of the band having inwardly extending heads, vertically slotted longitudinally and transversely, the tranverse slots extending downward to the lower face of the corresponding head, approximately globular nuts mounted in the transverse slots of said heads for oscillation, an oppositely threaded screw passing through the heads and engaging said nuts, manually operable means for rotating said screw in either direction and tire clamping means mounted on the band in each side of the split therein.

In testimony whereof I hereunto affix my signature.

JOHN C. RUMMER.